United States Patent [19]

Tayon et al.

[11] Patent Number: 5,086,662
[45] Date of Patent: Feb. 11, 1992

[54] REACTION BRAKE SYSTEM INCLUDING CLIP ADJUSTING MEANS

[75] Inventors: Jeffrey E. Tayon; Vernon E. Stewart, both of Moberly; Tave E. Hass, Columbia, all of Mo.

[73] Assignee: Orscheln Co., Moberly, Mo.

[21] Appl. No.: 584,636

[22] Filed: Sep. 19, 1990

Related U.S. Application Data

[63] Continuation-in-part of Ser. No. 466,963, Jan. 18, 1990, abandoned.

[51] Int. Cl.$^5$ ................................. F16C 1/22
[52] U.S. Cl. ........................... 74/501.5 R; 74/502.4; 188/196 B; 192/111 A; 411/523
[58] Field of Search ............ 74/501.5 R, 502.4–502.6; 188/265, 82.3, 196 B; 403/104, 257, 196; 411/522, 523, 524; 24/658

[56] References Cited

U.S. PATENT DOCUMENTS

| 2,868,484 | 1/1959 | Burrise | 411/523 |
| 3,178,987 | 4/1965 | Reese et al. | 411/523 |
| 3,768,612 | 10/1973 | Gale | 192/111 A |
| 3,789,967 | 2/1974 | Dau et al. | 74/501.5 R |
| 3,952,475 | 4/1976 | Paskert | 411/522 |
| 4,271,718 | 6/1981 | Bopp et al. | 74/552 |
| 4,366,725 | 1/1983 | Kondo | 74/502 X |
| 4,378,713 | 4/1983 | Haskell et al. | 74/501.5 R |
| 4,379,500 | 4/1983 | Kamino | 188/196 B |
| 4,463,843 | 8/1984 | Taig | 74/501.5 R |
| 4,658,668 | 4/1987 | Stocker | 74/501.5 R |
| 4,787,263 | 11/1988 | Jaksic | 74/501.5 R |
| 4,838,109 | 6/1989 | Stewart | 74/501.5 R |
| 4,854,185 | 8/1989 | Lichtenberg et al. | 74/501.5 R |
| 4,887,705 | 12/1989 | Solano et al. | 194/111 A |
| 4,889,006 | 12/1989 | Kolinske et al. | 74/502.4 |

FOREIGN PATENT DOCUMENTS

| 0034660 | 9/1981 | European Pat. Off. | 411/522 |
| 2515301 | 4/1975 | Fed. Rep. of Germany | 411/523 |
| 57-80959 | 5/1982 | Japan |  |
| 2102905 | 2/1983 | United Kingdom | 411/523 |

Primary Examiner—Richard Lorence
Assistant Examiner—Winnie Yip
Attorney, Agent, or Firm—Laubscher, Presta & Laubscher

[57] ABSTRACT

Parking brake apparatus of the reaction cable type includes quick-release cable slack adjusting means having a releasable clip member for retaining an adjusting rod against the biasing force of an adjusting spring at a given position relative to the reaction bracket housing. The clip member is of U-shaped resilient construction including a pair of leg portions that are resiliently biased together on opposite sides of a transverse wall portion of the housing containing an opening in which the rod is movably mounted. The clip member is displaceable orthogonally relative to the rod between a locking position in engagement with an annular groove contained in the rod, and a released position remote from the groove, whereby the rod is biased by the spring to remove cable slack.

10 Claims, 5 Drawing Sheets

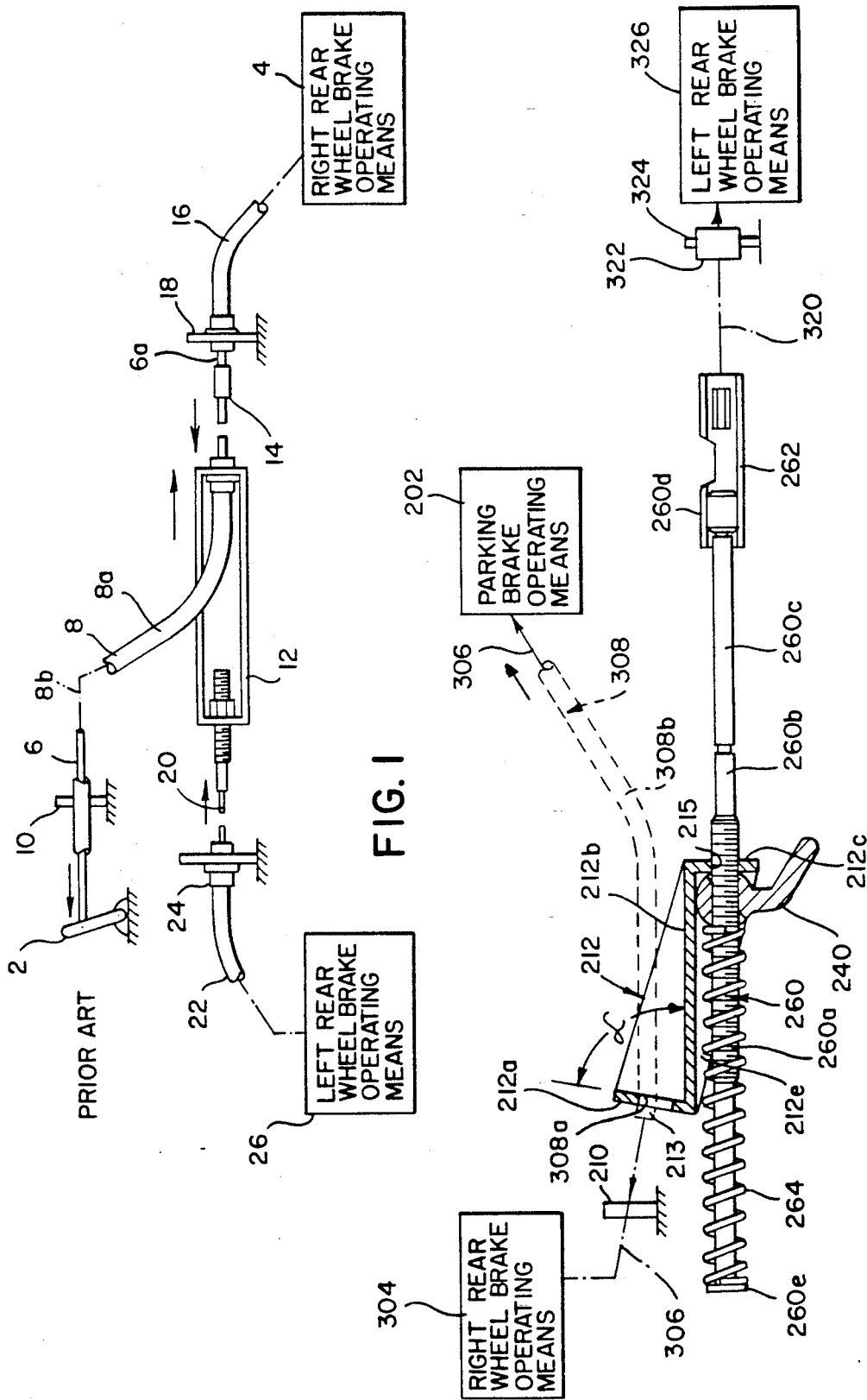

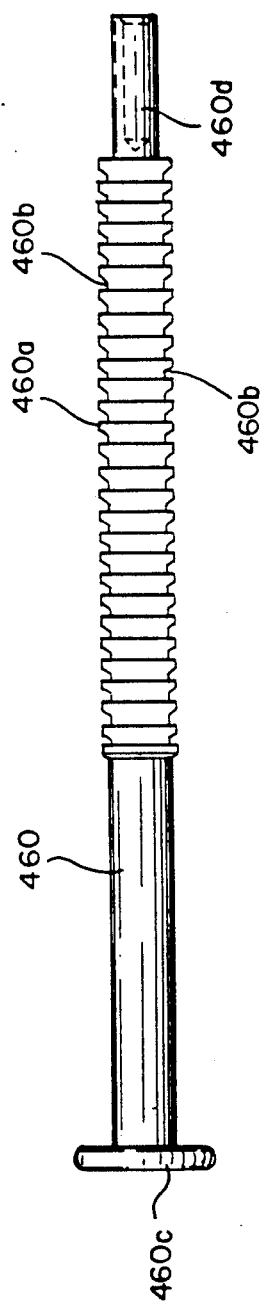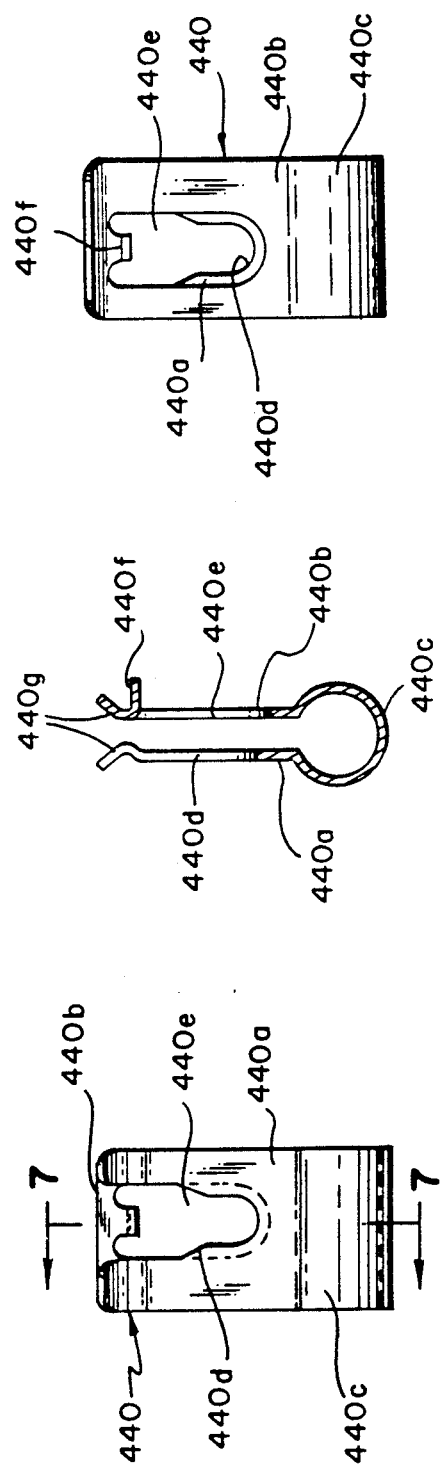

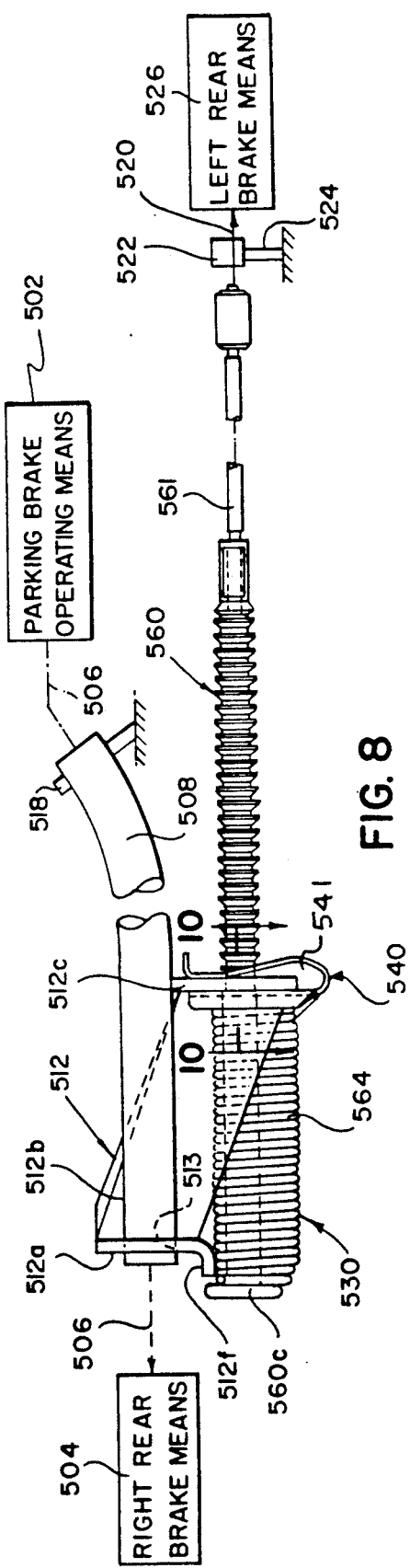
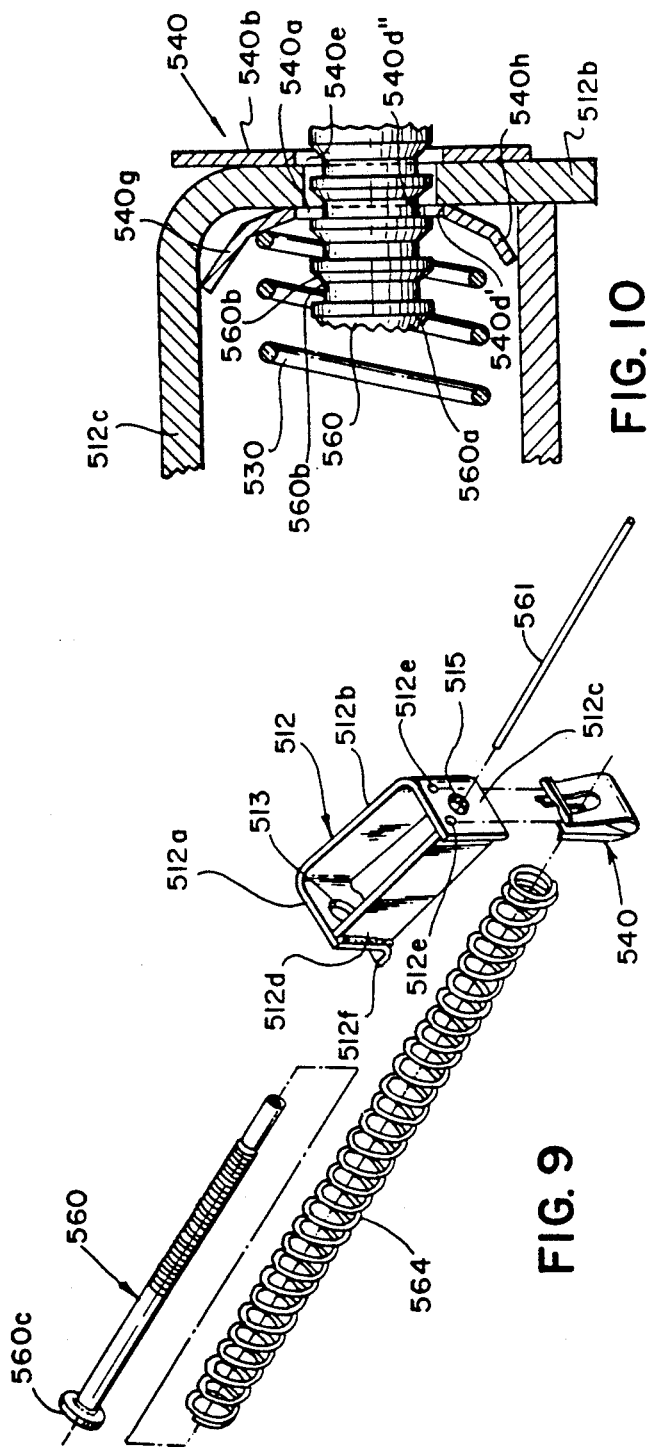

5,086,662

REACTION BRAKE SYSTEM INCLUDING CLIP ADJUSTING MEANS

REFERENCE TO PRIOR APPLICATION

This is a continuation-in-part application based on parent application Ser. No. 07/466,963 filed Jan. 18, 1990, now abandoned, in the name of Jeffrey E. Tayon.

STATEMENT OF THE INVENTION

This invention relates to improved quick-release cable slack adjusting means for use in a reaction-type parking brake system, use being made of a clip retainer that is operable for insertion in a corresponding annular groove contained in the slack adjusting rod to lock the same against displacement relative to the reaction bracket housing.

BRIEF DESCRIPTION OF THE PRIOR ART

It is well known in the patented prior art to provide cable slack adjusting means in cable systems for automotive vehicles. Evidence of such devices is presented by the patents to Gale No. 3,768,612, Dau et al 3,789,967, Bopp et al No. 4,271,718 and Haskell et al No. 4,378,713, among others. As shown by the Stocker U.S. Pat. No. 4,658,668, it is also known to provide clip means in apparatus for adjusting the effective length of an automotive cable.

In the Stewart Pat. No. 4,838,109, which issued recently to the same assignee as the assignee of the present invention, a conduit-reaction-type parking brake system is disclosed in which the parking brake operating means is connected with one of the rear wheel brake operating means via a slightly bent reaction conduit that extends through an opening contained in a reaction bracket. The other rear wheel brake operating means is so connected with the reaction bracket that when the operating member is displaced to tension the inner strand member to operate the first wheel brake operating means, the reaction conduit is caused to straighten somewhat, thereby to displace the reaction bracket and the second strand to operate the other rear wheel brake operating means. Cable slack adjusting means are provided including a pivotably-operable speed nut that is normally threadably engaged with the threaded intermediate portion of a cable slack adjusting rod to prevent axial displacement thereof relative to the cable bracket housing.

The present invention was developed to provide improved quick-release cable slack adjusting means for use in a reaction brake system that is less costly to manufacture and install than the aforementioned Stewart system, is more positive in operation, and is less likely to be inadvertently released.

SUMMARY OF THE INVENTION

Accordingly, a primary object of the present invention is to provide quick-release cable slack adjusting means for a reaction conduit type of parking brake for vehicles, including a retainer clip operable to engage one of a plurality of annular grooves contained in the spring-biased slack adjusting rod, thereby to prevent axial movement thereof relative to the reaction bracket housing.

According to a more specific object of the invention, the retainer clip member is of resilient U-shaped configuration including a pair of leg portions that are biased together on opposite sides of, and in engagement with, the bracket housing wall that contains an opening which receives the slack adjusting rod. One leg portion of the retainer clip contains a slot having a restricted semi-circular portion that is inserted in locking engagement within a corresponding annular groove contained in the outer periphery of the rod when the clip member is displaced orthogonally of the rod from a released position toward a locking position. A lateral tongue or flange limits the displacement of the retainer clip in the released direction relative to the rod.

BRIEF DESCRIPTION OF THE DRAWINGS

Other objects and advantages of the present invention will become apparent from a study of the following specification when viewed in the light of the accompanying drawing, in which:

FIGS. 1 and 2 illustrate somewhat diagrammatically two known embodiments of parking brake systems of the reaction cable type;

FIG. 4 is a side elevational view of the locking rod of member of FIG. 3;

FIGS. 5 and 6 are front and rear views of the spring clip retainer of FIG. 3;

FIG. 7 is a sectional view taken along line 7—7 of FIG. 5;

FIGS. 8 and 9 are side elevation and exploded views, respectively, of the preferred embodiment of the present invention;

FIG. 10 is a sectional view taken along line 10—10 of FIG. 8; and

DETAILED DESCRIPTION

Figure 3:
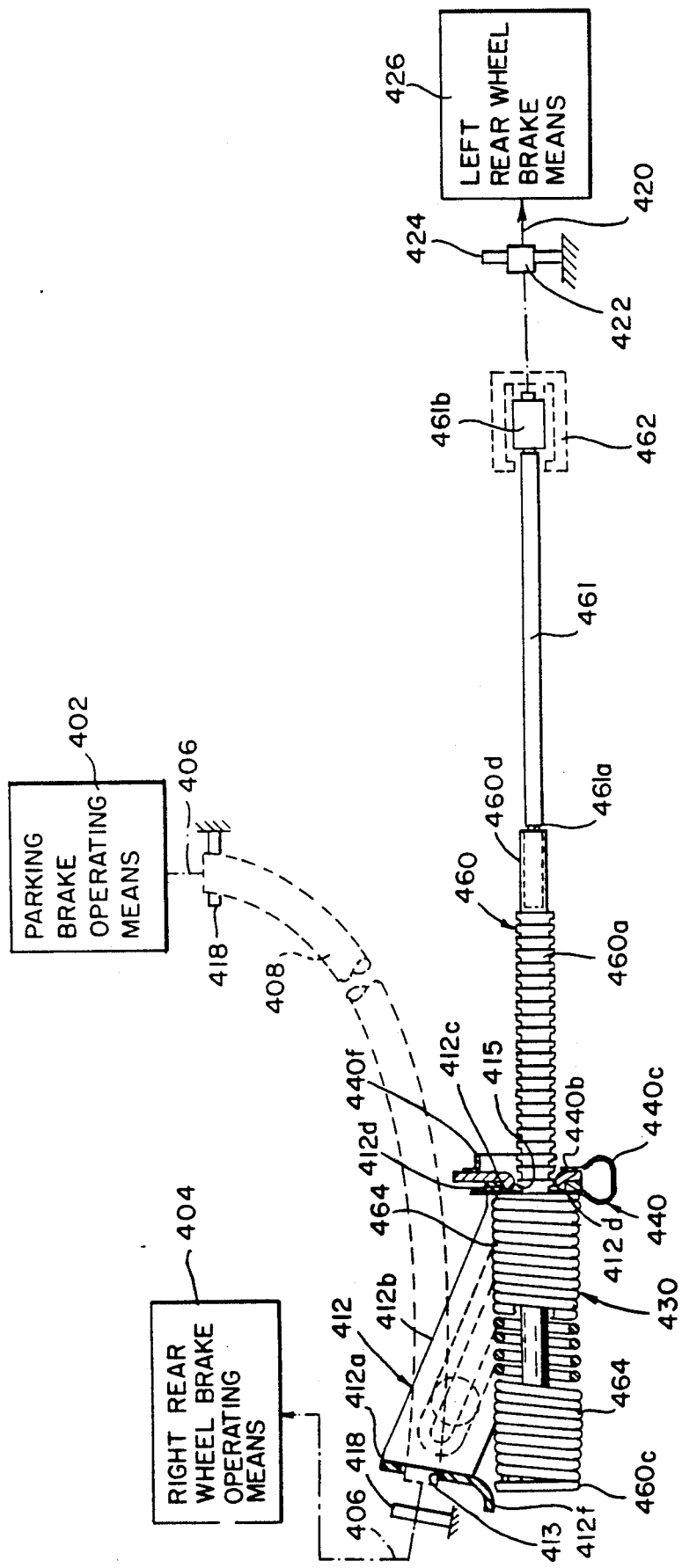
FIG. 3 illustrates the reaction cable type parking brake system according to a first embodiment of the present invention.
Figure 11:
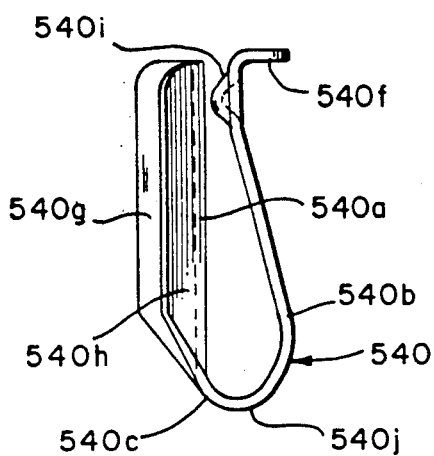
FIGS. 11-14 are side elevation, left elevation, right elevation and top plan views, respectively, of the clip member of FIGS. 8 and 9.
Figure 12:
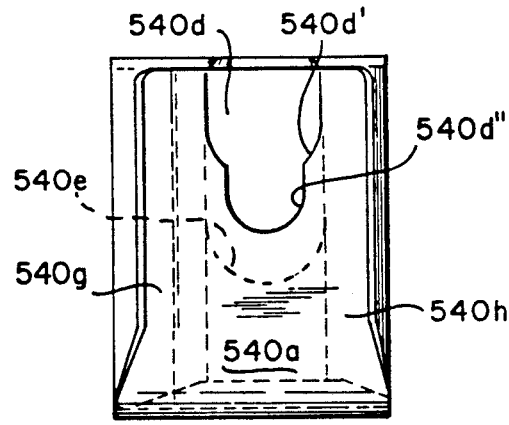
Figure 13:
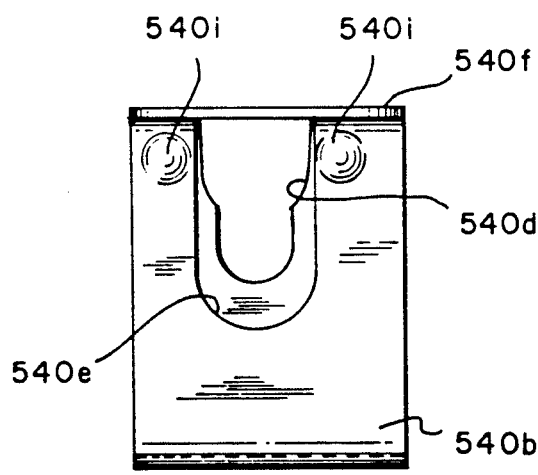
Figure 14:
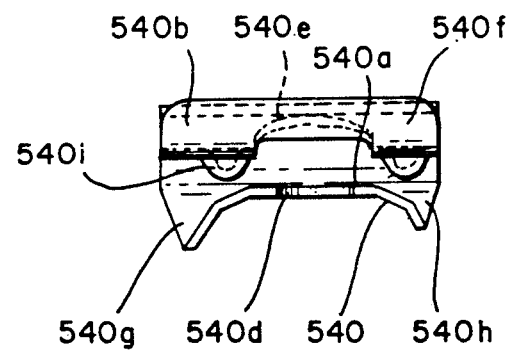

Referring more particularly to the prior art reaction conduit parking brake cable system of FIG. 1, the parking brake operating lever 2 is connected with the right rear wheel brake operating means 4 via a first inner strand member 6 that extends longitudinally through a tubular reaction conduit 8. One end of the reaction conduit 8 is secured to the chassis frame by a fixed support 10, and the other end of the reaction conduit is rigidly connected with a floating reaction bracket 12 having a transverse end wall containing a first opening to which the adjacent end of the reaction conduit is connected. The inner strand member 6 is connected by a connector 14 with an inner strand extension 6a that extends longitudinally through conduit 16 that is fastened at one end with the vehicle chassis by a fixed conduit 18. As is known in the reaction conduit art, the reaction conduit 8 contains at least one bent portion 8a which initially has a bend of approximately 90° when the inner strand 6 is in the untensioned condition. Connected with the other end of the reaction bracket 12 is the inner cable member 20 of a second cable assembly. The second strand 20 passes through a second conduit 22 that is connected at one end with a chassis by fixed connecting means 24, the other end of the cable strand 20 being connected with the left rear wheel brake operating means 26. As is known in the art, when operating lever 2 is pivoted in the counterclockwise direction, the first inner strand member 6 is tensioned (as shown by the arrows) to operate the right rear wheel operating means 4. As a consequence of the tensioning of the inner strand 6, the initially bent reaction conduit 8 tends to straighten, thereby placing the reaction conduit under compression, whereby the floating reaction bracket 12 is displaced to the right to longitudinally displace the second inner strand member 20 to the right to operate the left rear wheel brake means 26.

FIG. 2 illustrates a second reaction-cable-type parking brake system including the speed-nut quick-release cable slack adjusting means of the aforementioned Stewart U.S. Pat. No. 4,838,109. In this embodiment, the second inner strand member 320 is arranged on the same side of the floating reaction bracket 212 as the reaction conduit 308. Thus, in this embodiment, the parking brake operating means 202 is connected with the right rear wheel operating means 304 by the first inner strand member 306 that extends to the brake means via fixed conduit support 210, the first opening in the reaction bracket 212, the tubular conduit reaction conduit 308, and the fixed support 318. The second inner strand member 320 is connected at one end with the floating reaction bracket 212, and extends at its other end for connection with the associated brake means 326 via the associated outer conduit 322, and the fixed support 324. In this embodiment, when the first inner cable member 306 is tensioned (as shown by the arrow) to operate the right wheel brake operating means 304, the tensioning is accompanied by a straightening of the initially bent portion 308b reaction conduit 308. Owing to the straightening of the reaction conduit 308, the reaction bracket 212 is displaced to the left to tension the second inner strand member 320 to operate the left rear wheel brake operating means 326.

In order to remove the slack from the cable system, cable slack adjusting means are provided including an adjusting rod 260 having an externally threaded portion 260a extending through opening 215 contained in transverse bracket wall 212c, quick-release lock-out knob 240, and compression spring 264. When adjusting knob 240 is pivoted in the clockwise direction relative to threaded rod portion 260a, the internal threads of the quick-release knob are disengaged from the threads of the threaded portion 260a to permit expansion of the compression spring 264, whereupon the cylindrical end fitting 260 is shifted to the left relative to the reaction housing 212, thereby to remove slack from the second inner strand member 320.

When an equilibrium position is reached, the slack-adjusting lock-out knob 240 is pivoted to effect reengagement between the threads of threaded bore 246 and the external threads of the cylindrical end fitting member 260, whereupon the reaction-conduit-type parking brake system may now be operated in a conventional manner.

Referring now to a first embodiment of the present invention as illustrated in FIG. 3, the reaction bracket 412 includes at opposite ends a pair of transverse end wall portions 412a and 412c connected by a longitudinally extending intermediate portion 412b. Mounted at one end in the opening 413 contained in first wall portion 412a is one end of the first conduit 408 which contains the inner strand member 406 which connects parking brake operating means 402 with the right rear wheel brake means 404. At its other end, the first conduit 408 is fastened to fixed chassis support 418. The left rear wheel brake means 426 is connected with the reaction bracket 412 by the inner member 420 of a second cable having an outer conduit member 422 the end of which is connected with fixed chassis support 424.

In accordance with a characterizing feature of the present invention, improved quick-release cable slack adjusting means 430 are provided for connecting the left hand end of inner cable member 420 with the second transverse wall portion 412c of reaction bracket 412. More particularly, second wall portion 412c contains an opening 415 that is surrounded by reversely rolled wall portion 412d. Slidably mounted within the opening 415 is a slack-removing rod 460 having intermediate its ends an intermediate portion 460a containing on its outer periphery a plurality of annular locking grooves 460b defining therebetween a plurality of spaced circumferential cylindrical locking ribs. At its left hand end, the rod is provided with an enlarged terminal portion 460c, and the right hand end 460d of the rod contains a longitudinal bore within which is fastened (by staking, for example) the adjacent end portion 461a of connecting cable section 461. At its other end, cable section 461 is provided with an enlarged portion 461b that is connected with the adjacent end of inner cable member 420 by conventional connector means 462.

Helical compression spring 464 mounted concentrically on the cable slack adjusting rod 460 between enlarged end portion 460c and the bracket second wall portion 412c normally biases rod 460 to the left relative to bracket 412, thereby to tension inner cable member 420 and to remove slack therefrom. In order to lock the rod 460 to bracket 412 when the desired cable tension is obtained, there is provided, in accordance with the present invention, a generally U-shaped resilient retaining clip 440 (formed of spring steel, or the like) having front and rear leg portions 440a and 440b joined at their lower ends by a transverse connecting portion 440c. The front leg portion 440a s bifurcated to define a vertical keyhole slot 440d that terminates at its lower end in a semi-circular restricted wall portion that is adapted for insertion within a corresponding annular groove 460b contained in the ribbed portion 460a of cable slack adjusting rod 460. The rear leg portion 440b of retainer clip 440 contains an opening 440e opposite slot 440d, the upper end of this opening including an outwardly extending tongue portion 440f. At their upper ends, the clip leg portions, which are resiliently biased together on opposite sides of the assembly including second wall portion 412c and washer 414, terminate in outwardly bent extremities 440g.

The wall portions 412a and 412c are angularly inclined relative to each other so that when the cable system is in the brake-released condition, portions of the conduit 408 are initially bent somewhat to afford the desired reaction cable operation upon tensioning of inner cable member 406.

Flange portion 412f on bracket wall 412a prevents the spring 464 from catching on this wall, which otherwise would inhibit the adjustment operation.

OPERATION

In operation, to remove cable slack when the apparatus is in the initially locked condition of FIG. 3, the retainer clip is manually displaced downwardly relative to bracket 412 and rod 460, thereby to remove the restricted lower wall portion of keyhole slot 440d from the associated groove 460b in ribbed portion 460a of rod 460. Compression spring 464 expands to displace rod 460 to the left relative to bracket 412 to tension inner cable member 420 and to remove slack therefrom, thereby to insure proper subsequent operation of the reaction-type parking brake system. Downward movement of the resilient retaining clip is limited by the cooperation between tongue portion 440f and the ribbed surface of rod portion 460a, whereby the retaining clip is prevented from engagement with the grooves when in the released position.

After the spring 464 has been permitted to expand and the cable slack removing means has reached an equilibrium position, the spring clip 440 is manually displaced upwardly to insert the restricted lower wall portion of the keyhole slot within the corresponding groove 460b contained in ribbed position 460a of rod 460. Owing to the resilient biasing together of the leg portions 440a and 440b, the retaining clip is maintained in place against the deleterious forces of shock and vibration which occur during normal vehicle operation.

Referring now to the preferred embodiment of the invention illustrated in FIGS. 8-14, the bracket housing 512 includes a U-shaped portion formed from an annealed steel blank having a first arm portion 512a, a base portion 512b, and a second arm portion 512c parallel with said first arm portion but laterally offset therefrom, as shown in FIG. 8. A planar second housing portion 512d is welded between the extremities of the arm portions 512a and 512c. Arm portion 512a contains a first opening 513 for connection with the outer conduit member of cable 508, and arm portion 512c contains opening 515 for receiving adjusting rod 560. As a consequence of its 2-piece welded construction, the bracket housing 512 of FIG. 8 is less expensive to produce than the bracket housing 412 of FIG. 3.

The resilient adjusting clip member 540 includes, as shown more particularly in FIGS. 11-14, first and second arm portions 540a and 540b connected by a base portion 540c, the longitudinal central portion of first arm 540a being generally flat throughout its length for contiguous supported engagement by the corresponding surface of housing wall 512c, as shown in FIGS. 8 and 10. The first arm portion is provided at its lateral edges with angularly arranged folded strengthening wing portions 540g, 540h. The first arm portion contains a vertical slot 540d having an oversized upper portion 540d' and a restricted lower portion 540d", adapted for locking insertion within a groove 540b defined between a pair of lands 560a in the adjusting rod 560, as shown in FIG. 10. The second arm portion 540b contains a through opening 540e that receives the adjusting rod 560, as shown in FIG. 10. At its upper extremity, the arm 540b includes an outwardly bent flange portion 540f that now only limits the extent of downward displacement of the clip toward the disengaged position, but also strengthens the arm. On opposite sides of the opening 540e, the second arm 504b is provided with protrusions 540i which serve as detents for engagement with corresponding recesses or openings 512e formed in bracket arm 512c, thereby to retain the clip in is locked position of FIGS. 8 and 10. Concave portion 540j at the junction between arm 540a and connecting portion 540c defines an access opening 541 (FIG. 8) for receiving a clip-releasing tool, if desired.

The operation of the preferred embodiment of FIGS. 8-14 is the same as that of the embodiment of FIGS. 3-7, and will not be repeated.

Among the advantages afforded by the present invention, the clips of the embodiments of the present invention illustrated in FIGS. 3 and 8 are much less expensive to produce than the threaded quick-release member 240 of FIG. 2, and holding reliability is improved since a flat locking face on one leg of the resilient clip is supported by the adjacent surface of the bracket housing transverse wall. The annular grooves in the adjusting rod provide greater surface area for the clip than the screw threads of the quick-release member of FIG. 2. More definite, positive engaged and disengaged conditions of the clip are provided thereby improving the reliability of the mechanism. There is much greater safety against undesired disengagement of the clip, particularly, when provided with the detent retaining means 512e and 540c of FIGS. 9, 11 and 13. The clip member of the present invention is easier to assemble than the quick-release nut of the prior art, since the clip does not drag on the adjusting rod in the manner of the nut.

According to a further advantage of the preferred embodiment of FIGS. 8 and 9, the bracket housing permits the offset between the rod opening 515 and the cable opening 513 to be reduced. Since the openings 440e and 440e cause the clips to completely surround the adjusting rod, the clips cannot otherwise come off the rod and become lost. Also, the clip is prevented from being installed backwards. The opening 541 (FIG. 8) defined by the clip concave portion 540j allows the clip to be easily engaged for the adjustment operation. Manual pushing on the loop restores the clip to its locked condition.

Moreover, the spring legs 440a and 540a always extend between the end of the adjusting spring and the adjacent surface of the associated bracket housing transverse wall, as shown in FIGS. 3 and 10, thus preventing the spring from interfering from the locking and unlocking operation.

What is claimed is:

1. A parking brake operating system for a vehicle or the like including an operating member movably connected with a vehicle chassis, and a pair of brake operating means, comprising:
    (a) a floating reaction bracket housing (512) including a unitary generally U-shaped first housing portion defining a base portions (512b), and first and second arm portions (512a, 512c) connected with the ends of said base portion, said arm portions being generally parallel and relatively laterally offset, said arm portions containing first (513) and second (515) openings, respectively;
    (b) a reaction cable assembly, including:
        (1) a first outer tubular conduit (508) connected at one end with said reaction housing first opening, said first conduit being adapted for connection at its other end with the vehicle chassis;
        (2) a first inner strand member (506) mounted for relative longitudinal movement within said first conduit, said first strand member extending through said first housing opening and being adapted for connection at opposite ends with the operating member and with one of the wheel brake operating means, respectively;
    (c) second cable means including a second inner strand member (520) adapted for connection at one end with the other of the wheel brake operating means; and
    (d) quick-release cable slack adjusting means (530) for connecting the other end of said second inner strand member with said second housing opening, said cable slack adjusting means including:

(1) a rod (560) extending through said second housing opening, one end of said rod being connected with said second inner strand member and the other end of said rod having an enlarged end portion (560c), said rod including between its ends an intermediate portion containing on its periphery a plurality of longitudinally-spaced annular locking grooves (560b);

(2) a helical compression spring (564) arranged concentrically about said rod between said rod enlarged end portion and said second housing arm portion for biasing said rod longitudinally in one direction relative to said housing; and (3) clip means for preventing longitudinal displacement of said rod relative to said housing, said clip means including a clip member arranged for orthogonal displacement relative to said rod between locked and released positions relative to at least one of said grooves, (a) said clip member being generally U-shaped and including a pair of leg portions (540a, 540b) resiliently biased together toward engagement with opposite sides of second housing arm portion;

(b) a first leg portion (540a) of said clip member containing a locking slot (540d) having a relatively wide portion (540d') for freely receiving said rod intermediate portion when said clip member is in the released position, said slot including a restricted portion (540d") adapted for insertion within one of said grooves when said clip member is in said locked position.

2. Apparatus as defined in claim 1, wherein a second leg portion (540b) of said clip member contains a through opening (540e) through which said rod extends, said through opening being oversized relative to the diameter of said rod to permit said orthogonal displacement of said clip member between said locked and released positions.

3. Apparatus as defined in claim 2, wherein said second clip leg portion includes a laterally projecting stop portion (540f) adjacent said through opening for limiting the extent of movement of said clip member in the released direction.

4. Apparatus as defined in claim 2, wherein said first clip leg portion includes a central portion, and a pair of lateral strengthening wing portions (540g, 540h) extending angularly outwardly from said central portion in the direction of said first housing arm.

5. Apparatus as defined in claim 4, wherein the central portion of said first clip leg portion is straight and engages generally throughout its length the adjacent face of said housing second arm portion.

6. Apparatus as defined in claim 2, and further including detent means for retaining said clip member in the locked position, said detent means including at least one protrusion (540i) formed on said clip second leg portion for engagement with a corresponding recess (512e) contained in said housing second arm portion.

7. Apparatus as defined in claim 6, wherein said clip member includes a bridging portion (540c) connecting said leg portions, the junction between said bridging portion and said second leg portion being concave to define a tool access space (541) between said second leg portion and the adjacent surface of said housing second transverse wall.

8. Apparatus as defined in claim 4, wherein one end of said spring is in continuous engagement with the adjacent surface of said first clip leg portion at a location thereon adjacent the lateral edges of said wing portions.

9. Apparatus as defined in claim 1, wherein said housing further includes a second generally planar portion (512d) secured between the free extremities of the arms of said U-shaped first portion.

10. Apparatus as defined in claim 1, wherein said first housing arm portion includes a protective lateral flange portion (512f) arranged for sliding engagement by said spring, thereby to prevent said spring from catching on said arm.

* * * * *